United States Patent
Ho et al.

(10) Patent No.: US 8,422,174 B2
(45) Date of Patent: Apr. 16, 2013

(54) HEAD STACK ASSEMBLY AND HARD DISK DRIVE WITH THE SAME

(75) Inventors: Yiusing Ho, Hong Kong (CN); Canhua Chen, DongGuan (CN); Guohong Lu, DongGuan (CN)

(73) Assignee: SAE Magnetics (H.K.) Ltd., Hong Kong (CN)

( * ) Notice: Subject to any disclaimer, the term of this patent is extended or adjusted under 35 U.S.C. 154(b) by 233 days.

(21) Appl. No.: 12/929,197

(22) Filed: Jan. 6, 2011

(65) Prior Publication Data

US 2012/0099221 A1    Apr. 26, 2012

(30) Foreign Application Priority Data

Oct. 28, 2010  (CN) .......................... 2010 1 0539394

(51) Int. Cl.
*G11B 21/02* (2006.01)

(52) U.S. Cl.
USPC ...................................................... 360/264.2

(58) Field of Classification Search ............... 360/264.2, 360/265.9, 254.1, 294.4, 245.9, 245.2, 244.1, 360/265.7, 265.1
See application file for complete search history.

(56) References Cited

U.S. PATENT DOCUMENTS

| | | | | |
|---|---|---|---|---|
| 6,025,988 A * | 2/2000 | Yan | ............... | 361/679.37 |
| 6,809,905 B2 * | 10/2004 | Kilmer | ............... | 360/264.2 |
| 7,768,741 B2 * | 8/2010 | Feng | ............... | 360/125.03 |
| 2004/0233578 A1 * | 11/2004 | Gao | ............... | 360/125 |
| 2007/0253115 A1 * | 11/2007 | Yao et al. | ............... | 360/294.4 |
| 2007/0268623 A1 * | 11/2007 | Feng | ............... | 360/126 |
| 2007/0279807 A1 * | 12/2007 | Kobayashi et al. | ............... | 360/264.2 |
| 2009/0080111 A1 * | 3/2009 | Yao et al. | ............... | 360/234.5 |

\* cited by examiner

*Primary Examiner* — Allen T Cao
(74) *Attorney, Agent, or Firm* — Nixon & Vanderhye PC (57) ABSTRACT

An HSA comprises at least an HGA, a controlling circuit for controlling the HGA, and an actuator coil assembly comprising at least one top surface for mounting the HGA and a side surface for mounting the controlling circuit. The HGA has a first connection region parallel to the top surface, the first connection region has multiple first terminal pads formed thereon; the controlling circuit has a second connection region with multiple second terminal pads formed thereon, the second terminal pads are arranged in at least one row which is parallel to the top surface and the side surface, the first terminal pads are bonding to the corresponding second terminal pads to implement an electrical connection. The HSA has a compact structure as so to save space, and the connection way of the HGA and the controlling circuit is simple and solid.

15 Claims, 14 Drawing Sheets

Fig. 12

HEAD STACK ASSEMBLY AND HARD DISK DRIVE WITH THE SAME

This application claims the benefit of Chinese Patent Application No. 201010539394.X, filed Oct. 28, 2010, the entire contents of which is hereby incorporated by reference in this application.

FIELD OF THE INVENTION

The present invention relates to information recording disk drive devices and, more particularly to a head stack assembly (HSA), hard disk drive with the same, and a method of connecting a head gimbal assembly (HGA) to a controlling circuit thereof.

BACKGROUND OF THE INVENTION

Figure 1A:
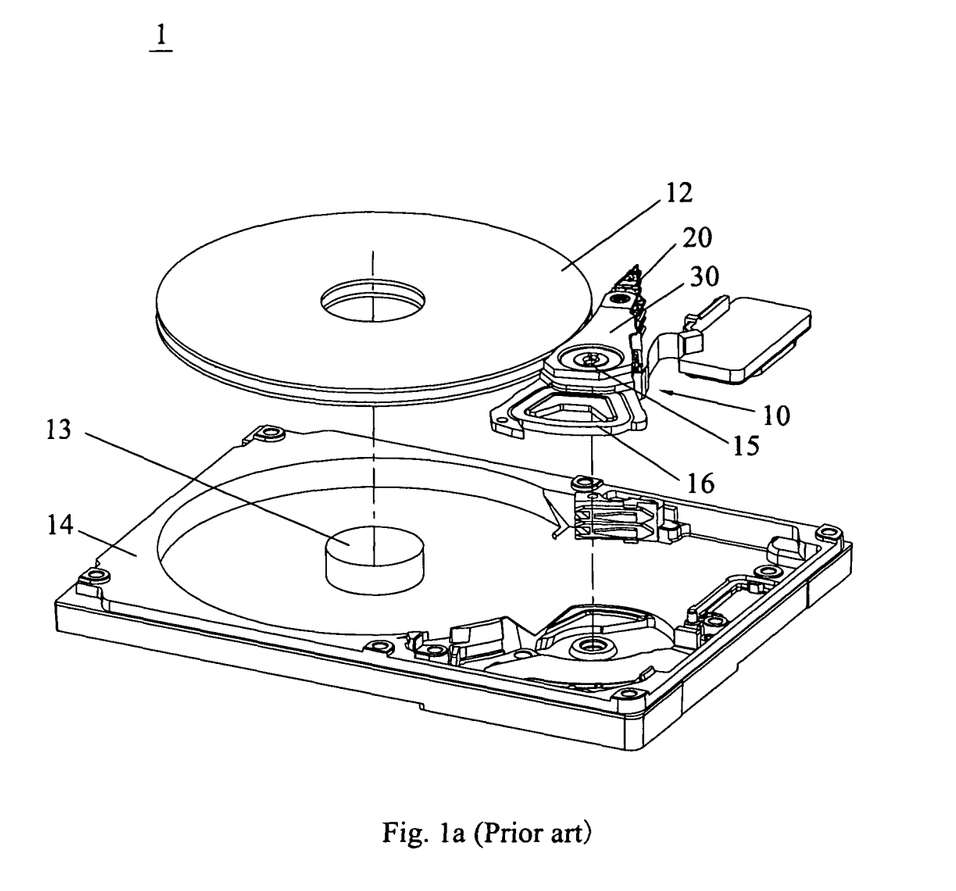
FIG. 1a is a perspective exploded view of a conventional hard disk drive.

Hard disk drives are information storage devices that use thin film magnetic media to store data. Referring to FIG. 1a, a typical hard disk drive 1 in prior art comprises a head stack assembly (HSA) 10 with slider 11 (shown in FIG. 1b) thereon, a magnetic disk 12 mounted on a spindle motor 13 which causes the magnetic disk 12 to spin, and a motor base 14 to enclose the above-mentioned components.

The slider 11 flies over the surface of the magnetic disk 12 at a high velocity to read data from or write data to concentric data tracks on the magnetic disk 12, which is positioned radially by a voice coil 15 embedded (e.g. by epoxy potting or overmolding) in a fantail spacer 16 of the HSA 10. Generally, a voice coil motor (VCM) 16 is used to drive the voice coil 15.

Figure 1B:
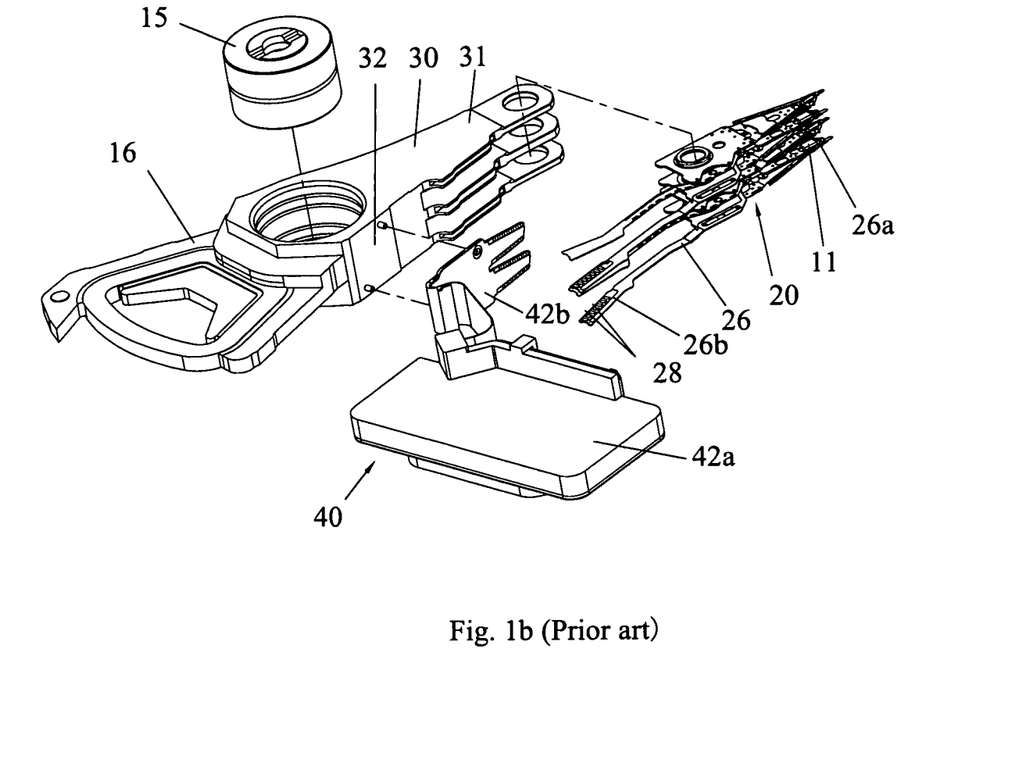

Referring to FIG. 1b, a traditional HSA 10 comprises an actuator coil assembly (ACA) 30, a fantail spacer 16 interposed in the ACA 30 via the voice coil 15, at least an HGA 20 connected with the ACA 30, and a controlling circuit 40 for controlling the HGA 20. The ACA 30 has at least one top surface 31 for mounting the HGA 20, and a side surface 32 for mounting the control circuit 40.

Figure 1C:
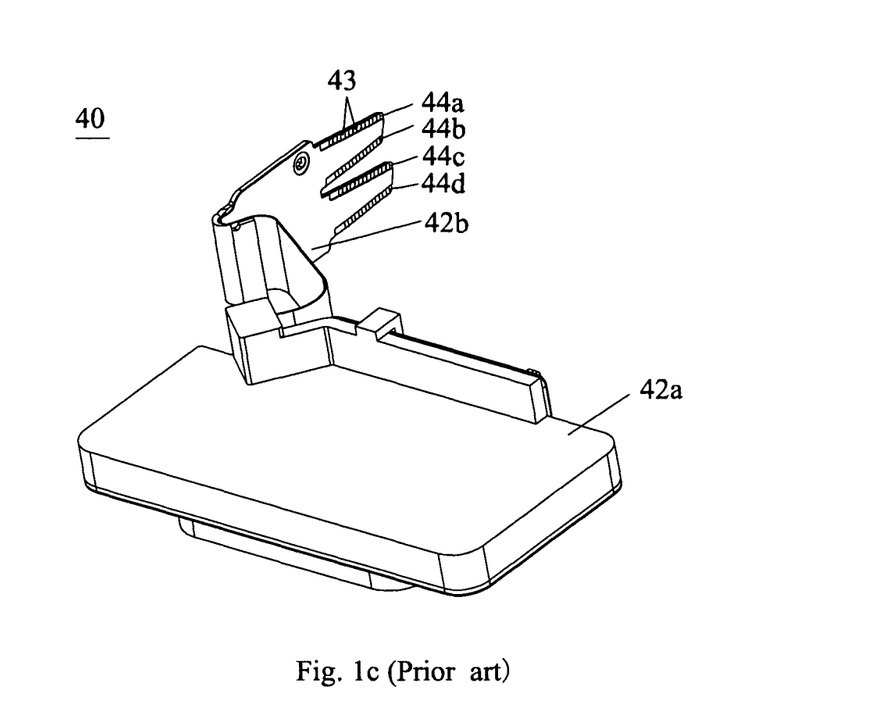
FIG. 1c shows a conventional controlling circuit of the HSA shown in FIG. 1b.

As shown in FIGS. 1b-1c, the controlling circuit 40 is a flexible printed circuit assembly (FPCA) that includes a printed circuit board assembly (PCBA) 42a for connecting with a preamplifier (not shown) and a flexible printed circuitry (FPC) 42b connecting with the PCBA 42a. And the FPC 42b electrically connects to the HGA 20, and mounts on the side surface 32 of the ACA 30.

The HGA 20 includes a flexure 26 having a head 26a and a tail 26b, and the flexure 26 runs from the slider 11 to the tail 26b. The tail 26b is bent for connecting with the FPC 42b. The tail 26b has several bonding pads 28 formed thereon. Concretely, the FPC 42b includes several rows of bonding pads 43 formed thereon, such as four rows 44a-44d. More concretely, the rows 44a-44d are arranged aslant as shown. That is, an angle is formed by the row 44a and a dashed line 27a as shown. Similarly, the other rows 44b-44d form an angle with the line 27a as well.

Figure 1D:
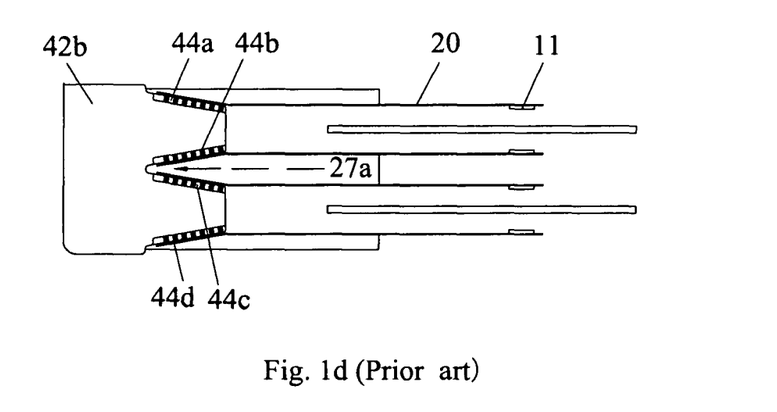

When connect the HGA 20 to the controlling circuit 40, for aligning the bonding pads 28 of the HGA 20 and the bonding pads 43 of the controlling circuit 40, the tail 26b must be bended so as to fit to the slantwise bonding pads 43. As shown in FIG. 1d, it can be seen that a bent portion is formed on the flexure 26 of the HGA 20, as described above. Thus, such a design makes the connection between the HGA 20 and the controlling circuit 40 difficult and complicated. Moreover, as the rows of bonding pad 43 are slantwise, the spacing among the HGA 20 is increased, which causes the size of the whole HSA 10 increased accordingly. Obviously, the prior art can not meet the actual demand seriously.

Thus, there is a need for an improved HSA and hard disk drive that do not suffer from the above-mentioned drawbacks.

SUMMARY OF THE INVENTION

One aspect of the present invention is to provide an HSA that has a compact structure as so to save space, and the connection way of the HGA and the controlling circuit is simple and solid.

Another aspect of the present invention is to provide a method of connecting an HGA with a controlling circuit thereof in an HSA, which can make the head stack assembly more compact to save space, and the connection way thereof is simple and solid.

Yet another aspect of the present invention is to provide a hard disk drive that has a compact structure as so to save space, and the connection way of the HGA and the controlling circuit is simple and solid.

To achieve above objectives, an HSA comprises at least an HGA, a controlling circuit for controlling the HGA, and an actuator coil assembly comprising at least one top surface for mounting the HGA and a side surface for mounting the controlling circuit. The HGA has a first connection region parallel to the top surface, the first connection region has multiple first terminal pads formed thereon; the controlling circuit has a second connection region with multiple second terminal pads formed thereon, the second terminal pads are arranged in at least one row which is parallel to the top surface and the side surface, the first terminal pads are bonding to the corresponding second terminal pads to implement an electrical connection.

As an exemplary embodiment, one slot is formed at the second connection region.

Preferably, the slot is formed parallel to the row of the second terminal pads.

Preferably, the first terminal pads are arranged in a row which is parallel to the row of the second terminal pads.

Preferably, the first terminal pads are bonded to the corresponding second terminal pads by laser soldering.

Preferably, the first connection region of the HGA has a first connection surface that the first terminal pads are formed thereon, the second connection region of the controlling circuit has a second connection surface that the second terminal pads are formed thereon, and the first connection surface is perpendicular to the second connection surface.

A method of connecting a head gimbal assembly with a controlling circuit thereof in an HSA comprising steps of:

providing an ACA comprising at least one top surface and a side surface;

providing at least one HGA having a first connection region which is parallel to the top surface of the actuator coil assembly;

forming first terminal pads on the first connection region;

providing a controlling circuit for controlling the at least one head gimbal assembly, which comprising a second connection region;

forming multiple second terminal pads on the second connection region, and arranging them in at least one row which is parallel to the top surface and the side surface; and aligning and bonding the first terminal pads with the corresponding second terminal pads.

Preferably, the instant method further comprises forming at least one slot at the second connection region. Preferably, the slot is slot parallel to row of the second terminal pads.

Preferably, the instant method further comprises arranging the first terminal pads in a row which is parallel to the row of the second terminal pads.

Preferably, the instant method further comprises bonding the first terminal pads to the corresponding second terminal pads by laser soldering.

Preferably, the instant method further comprises:

forming a first connection surface that the first terminal pads are formed thereon, forming a second connection surface that the second terminal pads are formed thereon; and bonding first terminal pads to the second terminal pads with the first connection surface being perpendicular to the second connection surface.

A hard disk drive comprises a motor base, a disk stack comprising at least one disk, a spindle motor being attached to the motor base for rotating the disk stack, and an HSA comprising at least an HGA, a controlling circuit for controlling the HGA, and an actuator coil assembly comprising at least one top surface for mounting the HGA and a side surface for mounting the controlling circuit. The HGA has a first connection region parallel to the top surface, the first connection region has multiple first terminal pads formed thereon; the controlling circuit has a second connection region with multiple second terminal pads formed thereon, the second terminal pads are arranged in at least one row which is parallel to the top surface and the side surface, the first terminal pads are bonding to the corresponding second terminal pads to implement an electrical connection.

As an exemplary embodiment, one slot is formed at the second connection region.

Preferably, the slot is formed parallel to the row of the second terminal pads.

Preferably, the first terminal pads are arranged in a row which is parallel to the row of the second terminal pads.

Preferably, the first terminal pads are bonded to the corresponding second terminal pads by laser soldering.

Preferably, the first connection region of the HGA has a first connection surface that the first terminal pads are formed thereon, the second connection region of the controlling circuit has a second connection surface that the second terminal pads are formed thereon, and the first connection surface is perpendicular to the second connection surface.

Compared with the prior art, as the first connection region of the HGA is parallel to the top surface of the ACA, the second terminal pads of the controlling circuit are arranged in rows which is parallel to the top surface and the side surface, thus, the HGAs directly connect with the controlling circuit without bending the first connection region. Accordingly, the spacing among the HGAs is smaller and, in turn, the size of the whole HSA is reduced, which meets the actual demand. Finally, a hard disk drive with the compact structure is obtained. Moreover, the connection way of the HGA and the controlling circuit is simple and solid, which can ensure the performance.

Other aspects, features, and advantages of this invention will become apparent from the following detailed description when taken in conjunction with the accompanying drawings, which are a part of this disclosure and which illustrate, by way of example, principles of this invention.

BRIEF DESCRIPTION OF THE DRAWINGS

The accompanying drawings facilitate an understanding of the various embodiments of this invention. In such drawings:

FIG. 1b is a perspective exploded view of a HSA of the hard disk drive shown in FIG. 1a;

FIG. 1d is a side elevation of the HSA shown in FIG. 1a;

FIG. 8b is a perspective view of the second connection region seen from the bottom shown in FIG. 8a;

DETAILED DESCRIPTION OF ILLUSTRATED EMBODIMENTS

Various preferred embodiments of the invention will now be described with reference to the figures, wherein like reference numerals designate similar parts throughout the various views. As indicated above, the invention is directed to an HSA and a method of connecting an HGA with a controlling circuit thereof, which the structure of the HSA is more compact, and the connection way is simple and solid.

Figure 2:
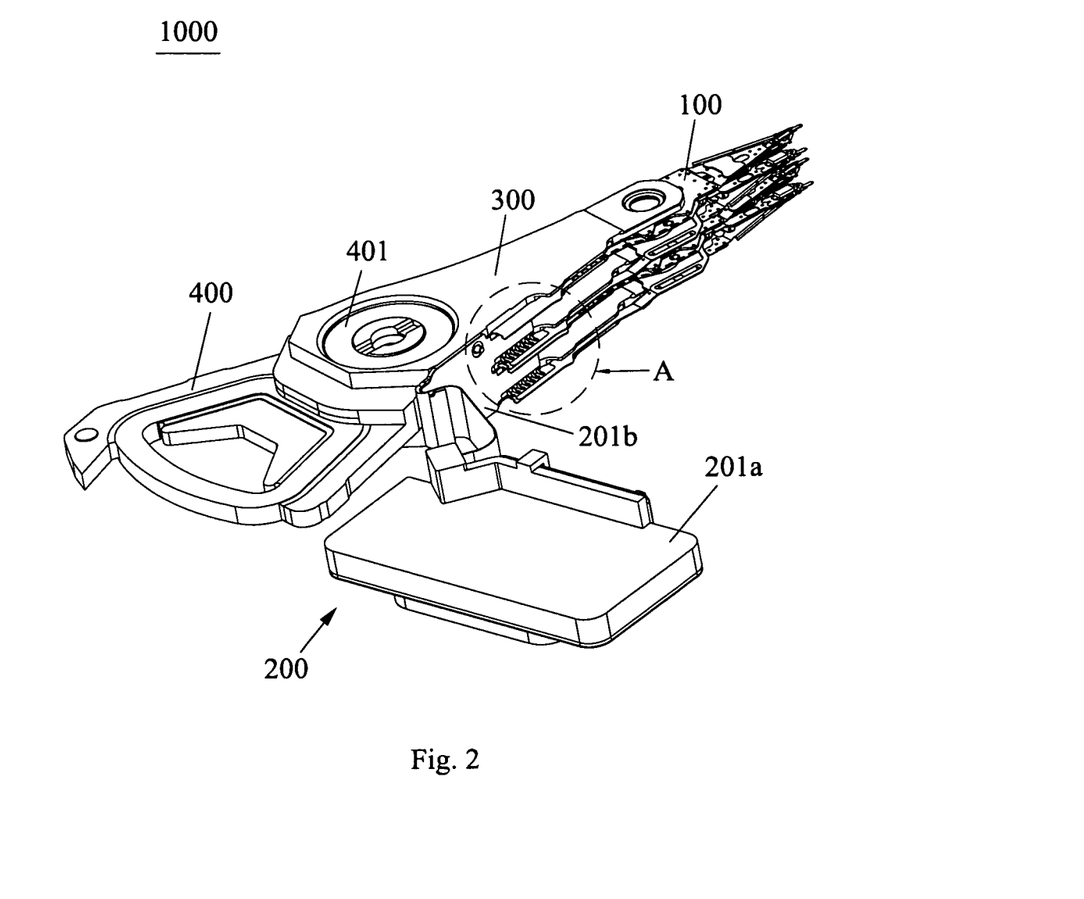
FIG. 2 is a perspective view of an HSA according to an embodiment of the present invention.
Figure 3:
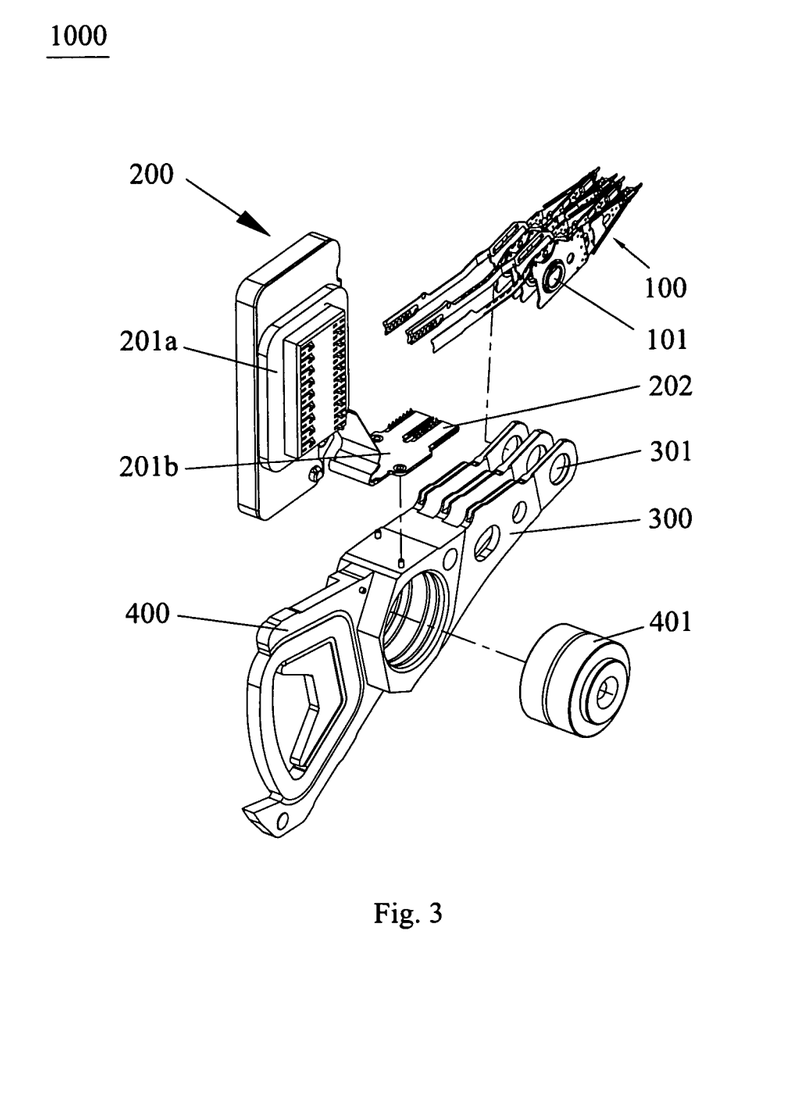
FIG. 3 is an perspective exploded view of the HSA shown in FIG. 2.
Figure 4:
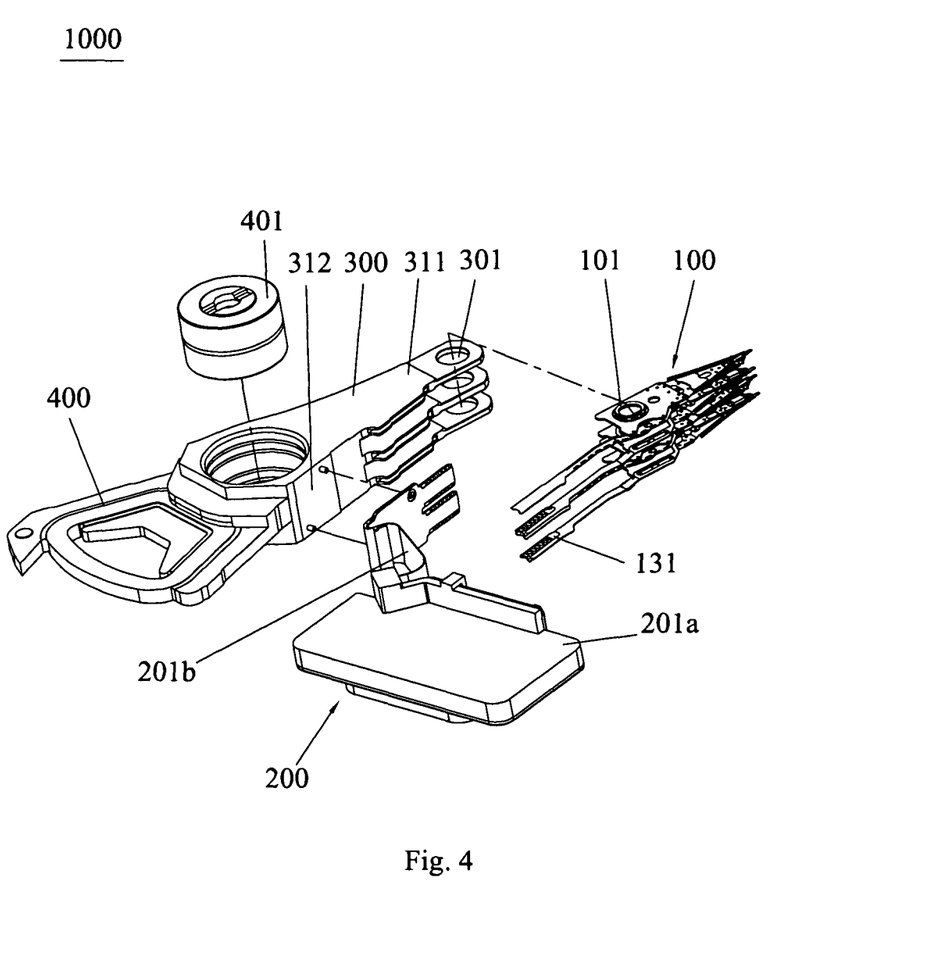
FIG. 4 is another perspective exploded view of the HSA omitting a connection medium shown in FIG. 2.

FIGS. 2-4 respectively show a perspective view and two exploded views of an HSA according to an embodiment of the present invention. As illustrated, the HSA 1000 includes several HGAs 100, such as four, a controlling circuit 200 for controlling the HGAs 100, an actuator coil assembly (ACA) 300 and a fantail spacer 400. Concretely, the ACA 300 includes at least one top surface 311 for mounting the HGAs 100, and a side surface 312 for mounting the controlling circuit 200. Concretely, the HGA 100 connects with the ACA 300 by aligning the holes 101 and 301, the fantail spacer 400 couples to the ACA 300 via a bearing 401. The controlling circuit 200 is a FPCB that includes a PCBA 201a for connecting with the preamplifier (not shown) and a FPC 201b connecting with the PCBA 201a. The FPC 201b has a second connection region 202 for attaching to the side surface 312 of the ACA 300. More specifically, the second connection region 202 connects with the HGA 100 for controlling the HGA 100. The more detailed description will be presented hereinafter.

Figure 5:
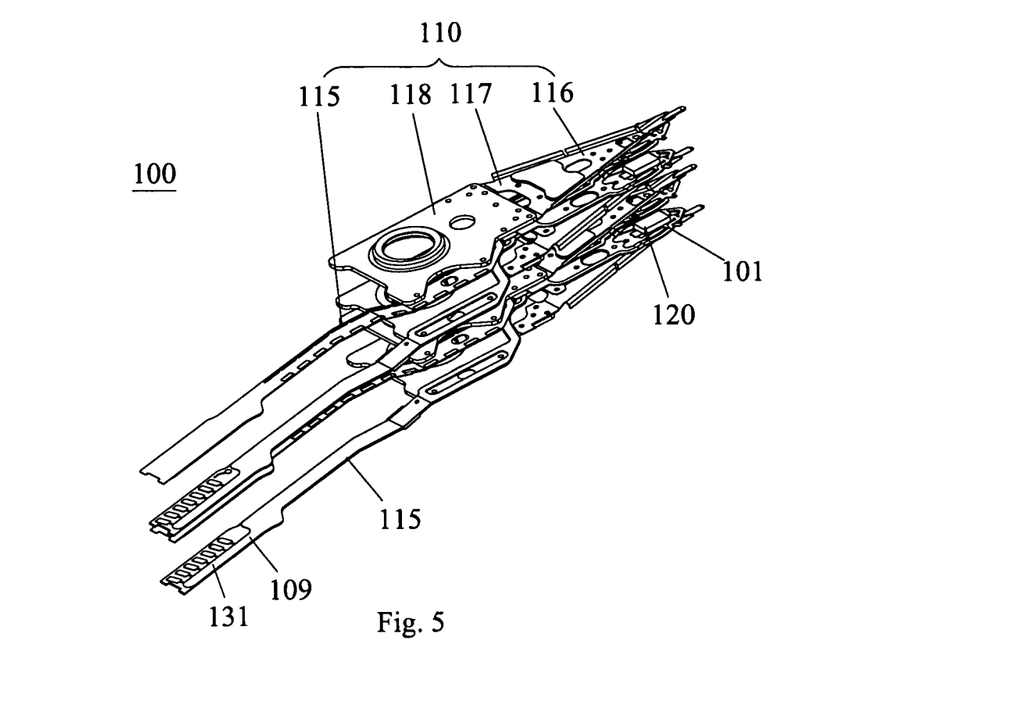
FIG. 5 shows a structure view of an HGA of the HSA shown in FIG. 4.

FIG. 5 shows a structure view of the HGA 100 of the HSA 1000 shown in FIG. 4. As shown in FIG. 5, the HGA 100 includes a suspension 110 and a slider 120 supported by the suspension 110. Concretely, the suspension 110 includes a load beam 116, a base plate 118, a hinge 117 and a flexure 115, all of which are assembled with each other. The flexure 115 runs from the hinge 117 to the load beam 116.

Figure 6:
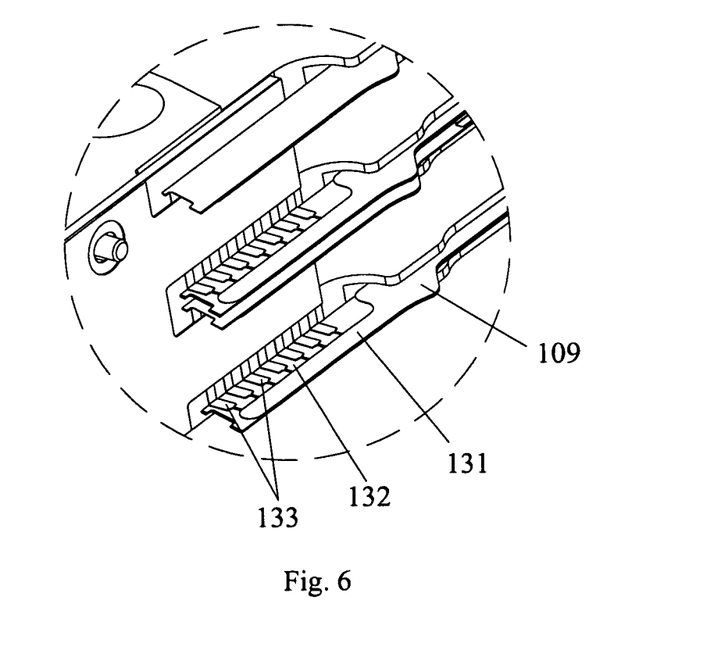
FIG. 6 shows an partial enlarged view of the portion A of the HSA shown in FIG. 2.

Based on the extending flexure 115 configuration, the HGA 100 generally has a head 101 located on one end of the flexure 115 adjacent to the slider 120, and a tail 109 located on the other end of the flexure 115. As shown in FIG. 6, the tail 109 has a first connection region 131 for connecting with the second connection region 202 of the controlling circuit 200. Concretely, the first connection region 131 is parallel to the top surface 311 of the ACA 300, that is, the tail 109 of the HGA 100 is straight without bending. The first connection region 131 has a first connection surface 132 on which multiple first terminal pads 133 are formed, for example, seven first terminal pads 133. The first terminal pads 133 are arranged in a row, preferably, the row of the first terminal pads is parallel to the row of the second terminal pads 212 (referring to FIGS. 7-8b) of the controlling circuit 200. In this embodiment, there are four HGAs, thus the rows of first terminal pads 133 are indicated by 141, 142, 143 and 144 (referring to FIGS. 9a, 9c, 10a).

Figure 7:
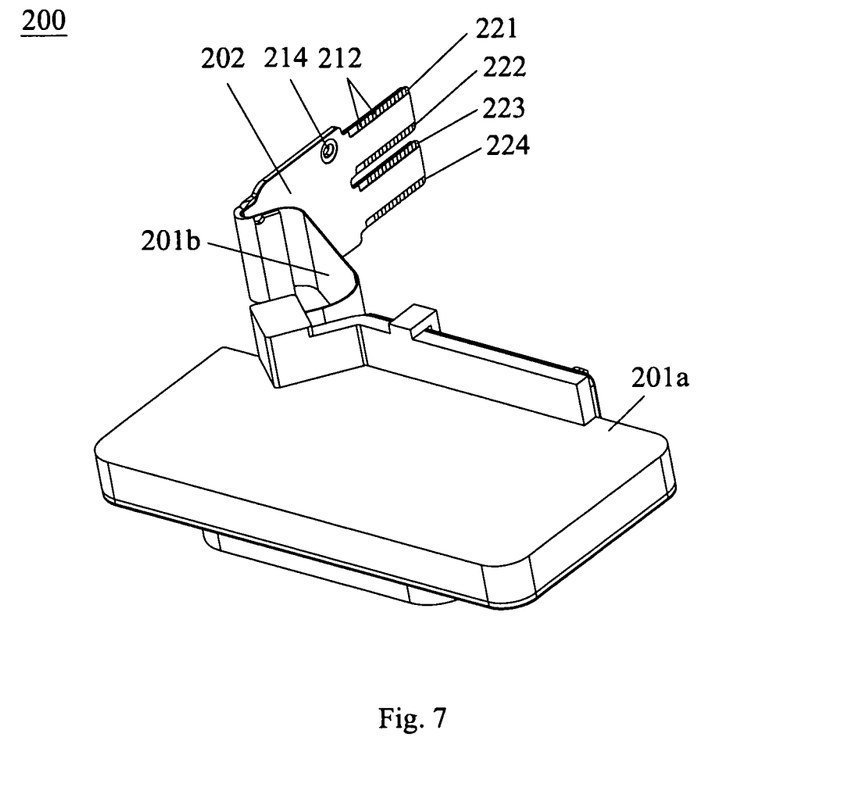
FIG. 7 shows a structure view of a controlling circuit of the HSA shown in FIG. 4.
Figure 8A:
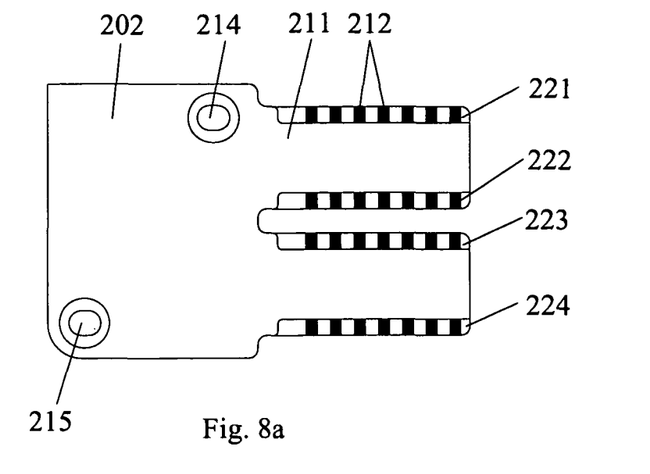
FIG. 8a is a top view of the second connection region of the controlling circuit shown in FIG. 7.
Figure 8B:
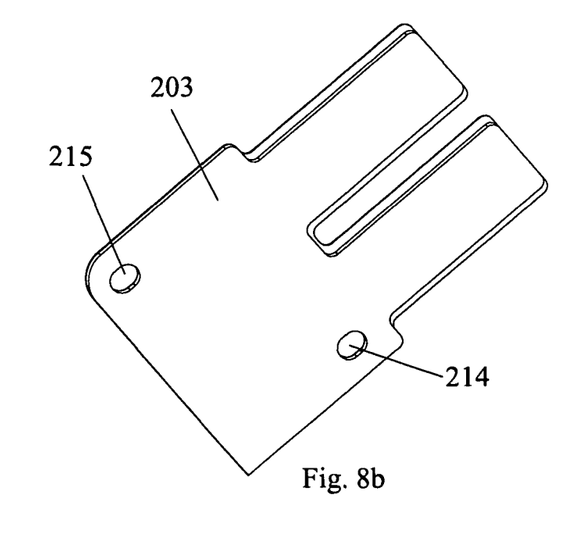

As shown in FIGS. 7-8b, the second connection region 202 of the controlling circuit 200 has a second connection surface 211 that multiple second terminal pads 212 are formed thereon. Specifically, the second terminal pads 212 are arranged in rows which are parallel to the top surface 311 and the side surface 312 of the ACA 300 (referring to FIG. 4). In this embodiment of the present invention, there are four parallel rows 221, 222, 223, 224 of second terminal pads 212 arranged, each row includes seven second terminal pads 212 that are corresponding to the first terminal pads 133 of the HGA 100. Two through holes 214, 215 are formed on the far end of the second connection region 202 for bonding and mounting to the ACA 300. At the back of the second connection region 202, a stiffener 203 is attached to the connection region 202 for enhancing the stiffness, as shown in FIG. 8b.

Figure 9A:
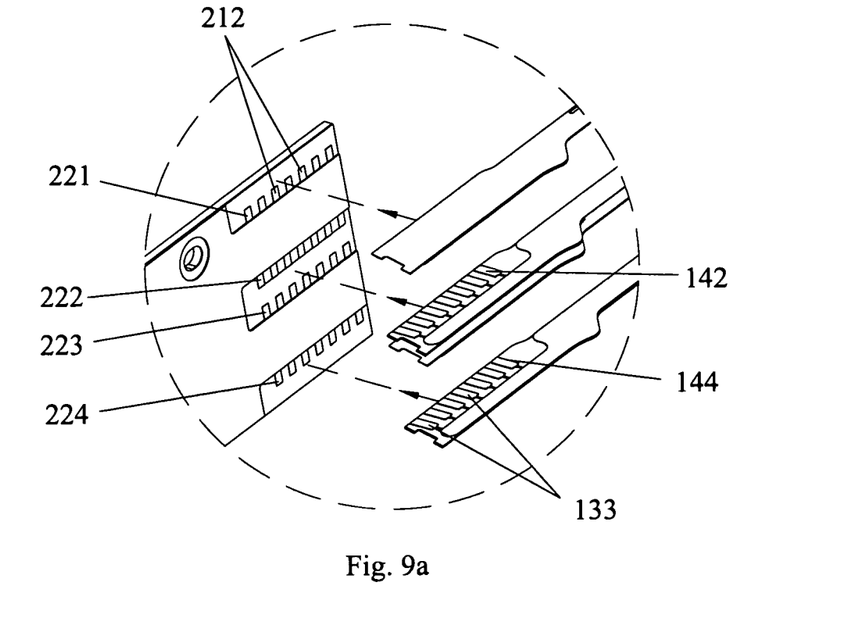
FIG. 9a shows a partial enlarged view of the HSA in the exploded status according to one embodiment of the present invention.
Figure 9B:
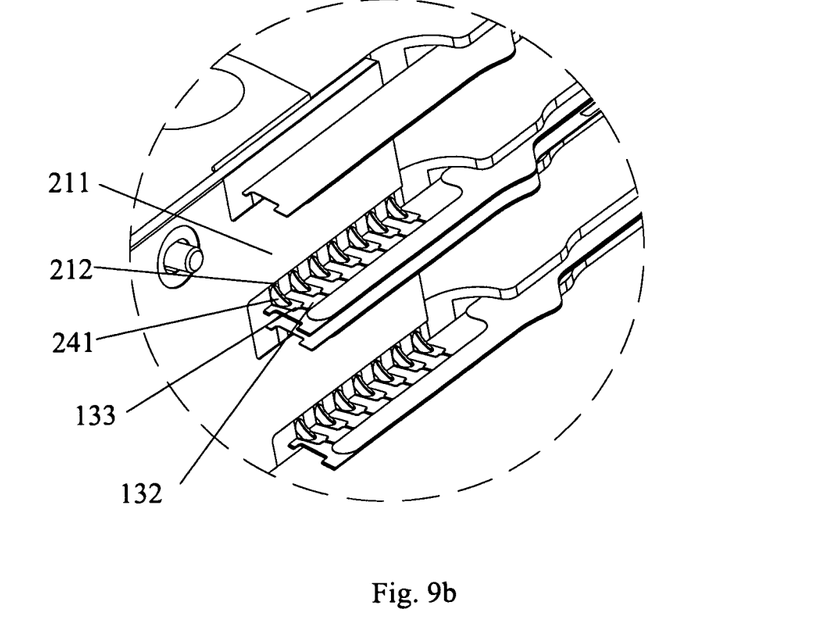
FIG. 9b shows a partial enlarged view of the HSA in the connecting status.
Figure 9C:
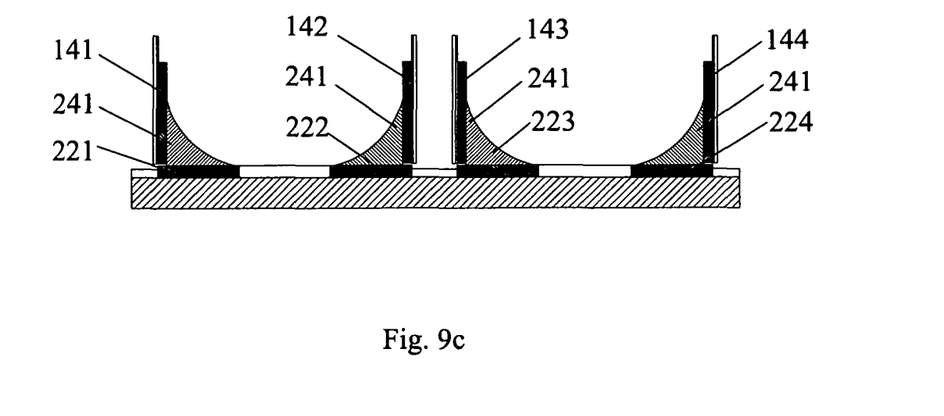
FIG. 9c is a sectional view that shows the connecting status shown in FIG. 9b.

As shown in FIG. 9a-9b, when connect the HGAs 100 to the controlling circuit 200, align each row 141-144 of first terminal pads 133 of the HGAs 100 with each row 221-224 of second terminal pads 212 of the second connection region 202, so that the first connection surface 132 of the first connection region 131 is perpendicular to the second connection surface 211 of the second connection region 202, that is, each row of first terminal pad is perpendicular to the corresponding row of second terminal pads 212, and then bond them together via a connecting mean, laser soldering jet 241, for example. The connecting status is shown in FIG. 9c. Due to the first terminal pads 133 and the second terminal pads 212 are bonding via the laser soldering jet 241, thus the pitch between the first terminal pads 133 and the second terminal pads 212 is shortened and reduced; accordingly, the whole size of the terminal pads is reduced. In conclusion, As the first connection region 131 of the HGA 100 is parallel to the top surface 311 of the ACA, the second terminal pads 212 of the controlling circuit 200 are arranged in rows which are parallel to the top surface 311 and the side surface 312, thus, the HGA 100 directly connects with the controlling circuit 200 without bending. Accordingly, the spacing among the HGAs 100 is smaller and, in turn, the size of the whole HAS 1000 is reduced, which meets the actual demand.

Figure 10A:
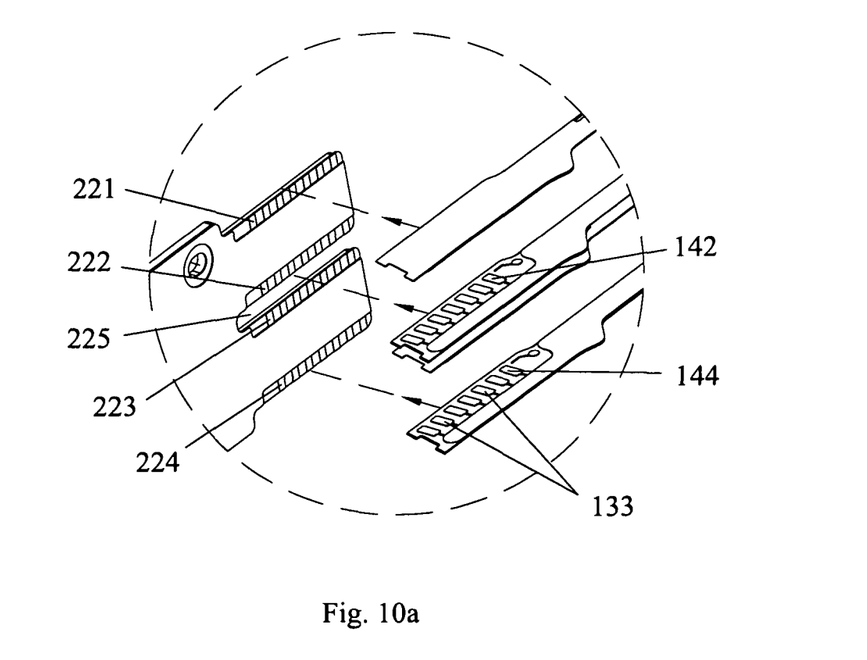
FIG. 10a shows a partial enlarged view of the HSA in the exploded status according to another embodiment of the present invention.
Figure 10B:
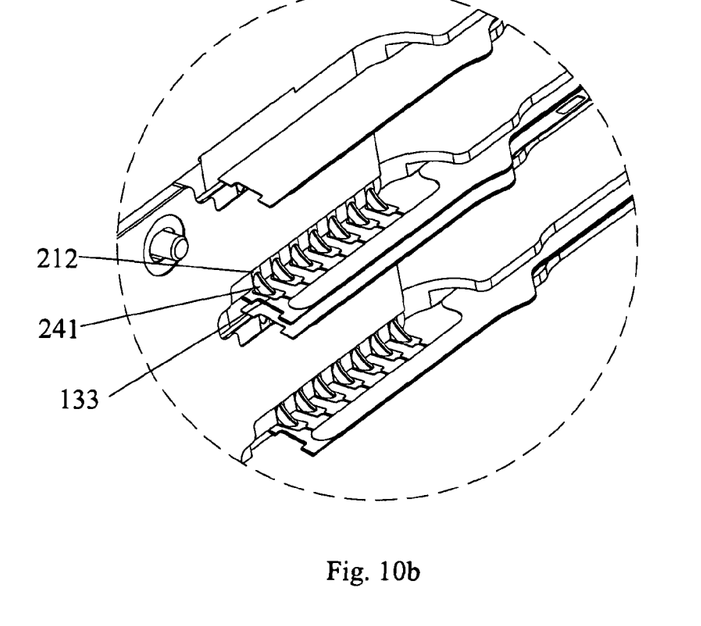
FIG. 10b shows a partial enlarged view of the HSA in the connecting status.
Figure 10C:
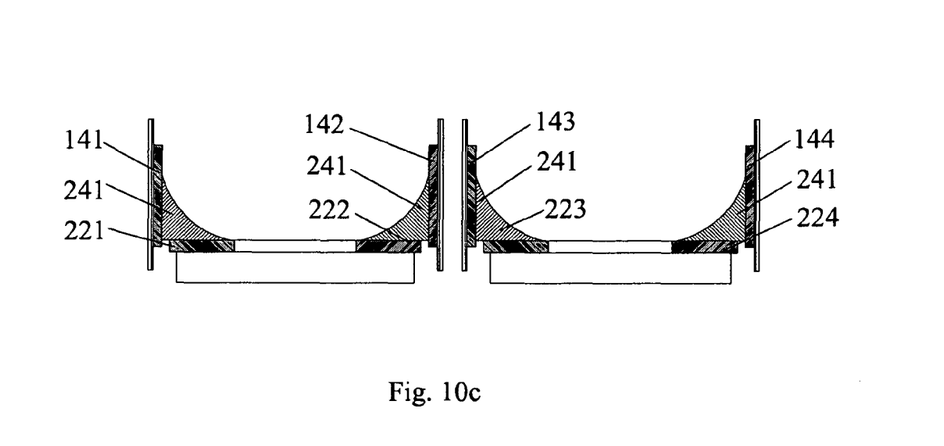
FIG. 10c is a sectional view that shows the connecting status shown in FIG. 10b.

As an exemplary embodiment shown in FIG. 10a-10c, at least one slot 225 is form at the second connection region 202 parallel to the row of the second terminal pads 212. Preferably, the slot 225 is a lathy shape. The slot 225 is formed between the row 222 and row 223 and parallel to the rows 221-224. The slot 225 can make the whole HSA 1000 more flexible. When bond the HGA 100 to the second connection region 202, the tail 109 with the first terminal pads 133 of the HGA 100 partially inserts into the slot 225, thus it makes the aligning easier. Concretely, the row 141 of HGA 100 aligns with upper edge of the row 221, the rows 142 and 143 of HGAs 100 are partially inserted into the slot 225 and aligned with the rows 222 and 223, and the row 144 aligns with the lower edge of the row 224. And then, bond them together via the laser soldering jets 241 respectively as mentioned above.

FIG. 10c shows a side elevation of the HSA 1000 with the HGA 100 connecting with the controlling circuit 200 according to the present invention. It can be seen that, the tails 109 of the HGAs 100 are directly connected with the controlling circuit 200 without bending the tail 109, that is, the first connection region 131, as the rows of second terminal pads 212 are arranged along the length direction 12 of the HGA 100 and parallel to each other. Accordingly, the spacing among the HGAs 100 is smaller comparing to the prior art and, in turn, the size of the whole HSA 1000 is reduced, which meets the actual demand. Finally, a hard disk drive with the compact structure is obtained.

Figure 11:
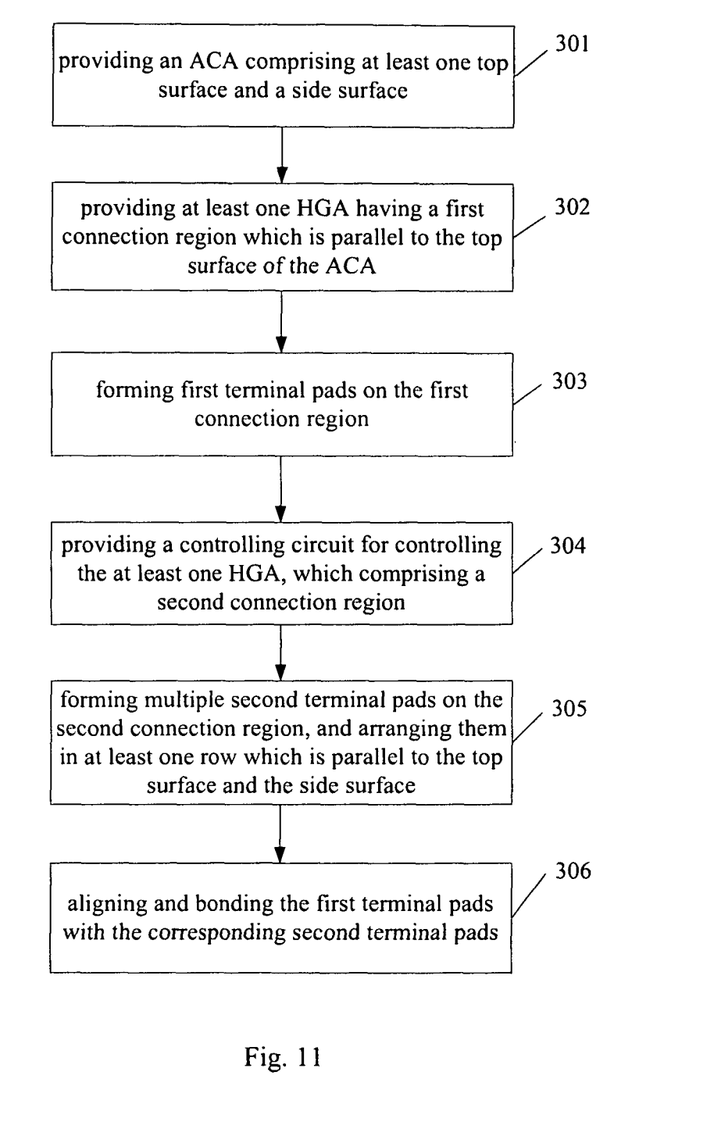
FIG. 11 is a flow chart that shows a method of connecting an HSA with a controlling circuit thereof according to one embodiment of the present invention.

Turning now to FIG. 11, a method of connecting a HGA with a controlling circuit thereof in an HAS 1000 according to one embodiment of the present invention is shown, which comprises steps of:

Step (301), providing an ACA comprising at least one top surface and a side surface;

Step (302), providing at least one HGA having a first connection region which is parallel to the top surface of the ACA;

Step (303), forming first terminal pads on the first connection region;

Step (304), providing a controlling circuit for controlling the at least one HGA, which comprising a second connection region;

Preferably, at least one slot is formed at the second connection region for making the connection easier and making the HSA more flexible. More preferably, the slot is parallel to rows of the second terminal pads.

Step (305), forming multiple second terminal pads on the second connection region, and arranging them in at least one row which is parallel to the top surface and the side surface; and Step (306), aligning and bonding the first terminal pads with the corresponding second terminal pads.

Concretely, the first terminal pads in a row which is parallel to the row of the second terminal pads. And the bonding means thereof is the laser soldering, such as the soldering jet and the like, so as to reduce the pitch of the two terminal pads.

As a preferable embodiment, the method further comprises forming a first connection surface at the first connection region, for forming the first terminal pads thereon; forming a second connection surface at the second connection region, for forming the second terminal pads thereon; and bonding first terminal pads to the second terminal pads with the first connection surface being perpendicular to the second connection surface.

Comparing with the prior art, the method of connecting a HGA with a controlling circuit thereof according to the present invention can connect the HGA straightly and without bending the first connection region, thus, the pacing among the HGAs is smaller comparing to the prior art and, in turn, the size of the whole HSA is reduced, which meets the actual demand. Finally, a hard disk drive with the compact structure is obtained. Such connection way of the HGA and the controlling circuit is simple and solid, which is beneficial to the performance of the hard disk drive.

Figure 12:
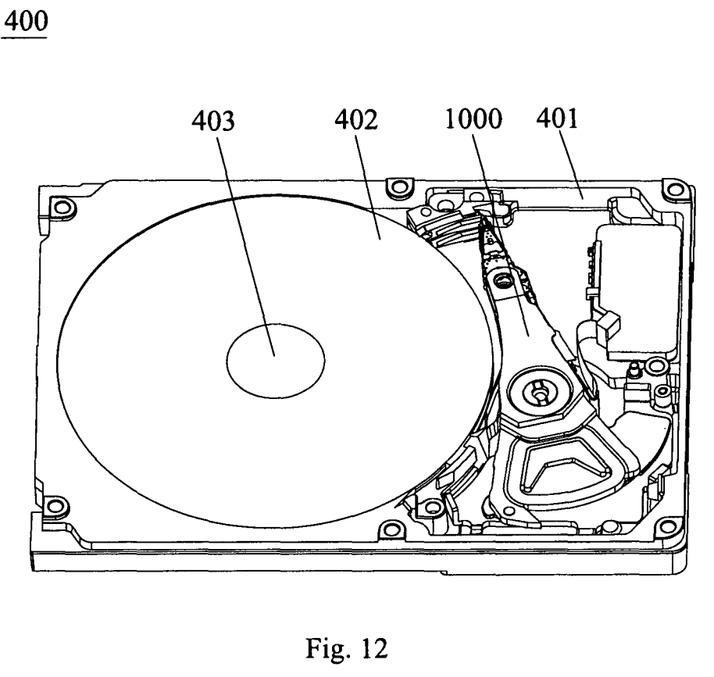
FIG. 12 shows a hard disk drive according to one embodiment of the present invention.

FIG. 12 shows a hard disk drive 400 according to one embodiment of the present invention. The hard disk drive 400 includes a motor base 401, a disk stack comprising at least one disk 402, a spindle motor 403 being attached to the motor base 401 for rotating the disk stack, and an HSA 1000. As described above, the HSA 1000 includes all features and advantages that have been recorded thereinbefore according the present invention. In addition, as the structure and/or assembly process of hard disk drive of the present invention are well known to persons ordinarily skilled in the art, a detailed description of such structure and assembly is omitted herefrom.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention.

What is claimed is:

1. A head stack assembly, comprising:
at least one head gimbal assembly;
a controlling circuit for controlling the head gimbal assembly; and
an actuator coil assembly comprising at least one top surface for mounting the head gimbal assembly and a side surface for mounting the controlling circuit;
wherein the head gimbal assembly has a first connection region parallel to the top surface, the first connection region has multiple first terminal pads formed thereon; the controlling circuit has a second connection region with multiple second terminal pads formed thereon, the second terminal pads are arranged in at least one row which is parallel to the top surface and the side surface respectively, the first terminal pads are bonding to the corresponding second terminal pads to implement an electrical connection, wherein the first connection region of the head gimbal assembly has a first connection surface that the first terminal pads are formed on, the second connection region of the controlling circuit has a second connection surface that the second terminal pads are formed on, and the first connection surface is perpendicular to the second connection surface.

2. The head stack assembly according to claim 1, wherein at least one slot is formed at the second connection region.

3. The head stack assembly according to claim 2, wherein the slot is parallel to the row of the second terminal pads.

4. The head stack assembly according to claim 1, wherein the first terminal pads are arranged in a row which is parallel to the row of the second terminal pads.

5. The head stack assembly according to claim 1, wherein the first terminal pads are bonded to the corresponding second terminal pads by laser soldering.

6. A method of connecting a head gimbal assembly with a controlling circuit thereof in a head stack assembly comprising steps of:
providing an actuator coil assembly comprising at least one top surface and a side surface;
providing at least one head gimbal assembly having a first connection region which is parallel to the top surface of the actuator coil assembly;
forming multiple first terminal pads on a first connection surface of the first connection region;
providing a controlling circuit for controlling the head gimbal assembly, which comprising a second connection region;
forming multiple second terminal pads on a second connection surface of the second connection region, and arranging them in at least one row which is parallel to the top surface and the side surface; and
aligning and bonding the first terminal pads with the corresponding second terminal pads with the first connection surface is perpendicular to the second connection surface.

7. The method according to claim 6, wherein further comprises forming at least one slot at the second connection region.

8. The method according to claim 7, wherein further comprises forming the slot parallel to row of the second terminal pads.

9. The method according to claim 6, wherein further comprises arranging the first terminal pads in a row which is parallel to the row of the second terminal pads.

10. The method according to claim 6, wherein further comprises bonding the first terminal pads to the corresponding second terminal pads by laser soldering.

11. A hard disk drive, comprising:
a motor base;
a disk stack comprising at least one disk;
a spindle motor being attached to the motor base for rotating the disk stack; and
a head stack assembly comprising at least one head gimbal assembly, a controlling circuit for controlling the head gimbal assembly, and an actuator coil assembly comprising at least one top surface for mounting the head gimbal assembly and a side surface for mounting the controlling circuit;
wherein the head gimbal assembly has a first connection region parallel to the top surface, the first connection region has multiple first terminal pads formed thereon; the controlling circuit has a second connection region with multiple second terminal pads formed thereon, the second terminal pads are arranged in at least one row which is parallel to the top surface and the side surface, the first terminal pads are bonding to the corresponding second terminal pads to implement an electrical connection, wherein the first connection region of the head gimbal assembly has a first connection surface that the first terminal pads are formed on, the second connection region of the controlling circuit has a second connection surface that the second terminal pads are formed on, and the first connection surface is perpendicular to the second connection surface.

12. The hard disk drive according to claim 11, wherein at least one slot is formed at the connection region.

13. The hard disk drive according to claim 12, wherein the slot is formed parallel to row of the second terminal pads.

14. The head stack assembly according to claim 11, wherein the first terminal pads are arranged in a row which is parallel to the row of the second terminal pads.

15. The hard disk drive according to claim 11, wherein the first terminal pads are bonded to the corresponding second terminal pads by laser soldering.

* * * * *